Dec. 9, 1930.  F. C. THOMPSON  1,783,987
CHAIN ADJUSTING DEVICE
Filed Feb. 19, 1929  2 Sheets-Sheet 1
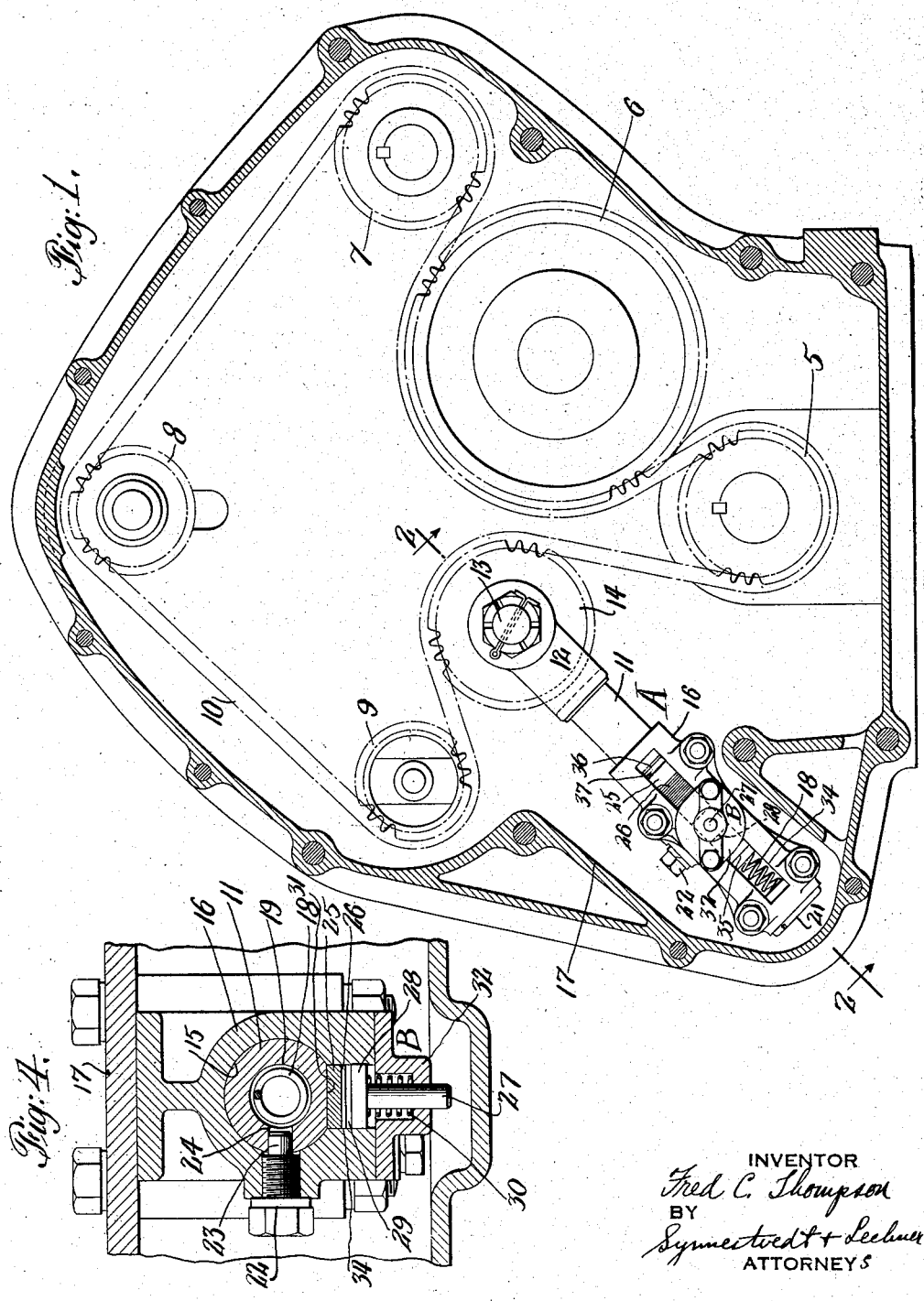

Dec. 9, 1930.  F. C. THOMPSON  1,783,987
CHAIN ADJUSTING DEVICE
Filed Feb. 19, 1929   2 Sheets-Sheet 2
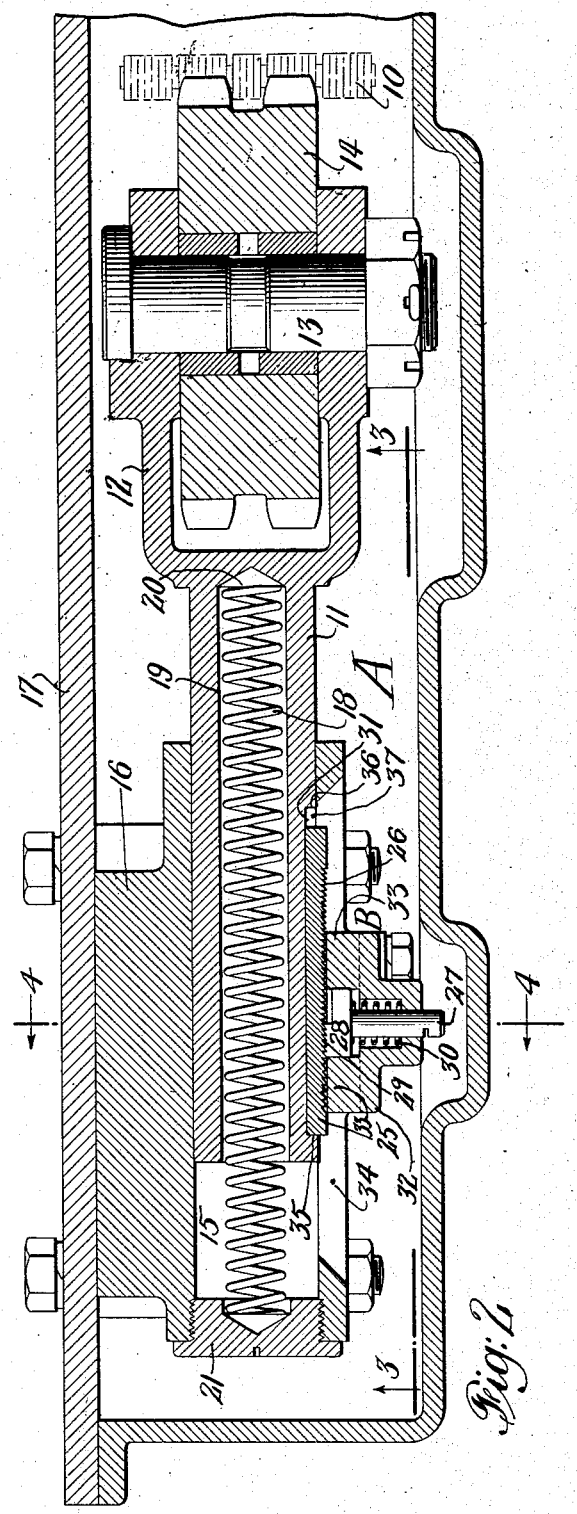
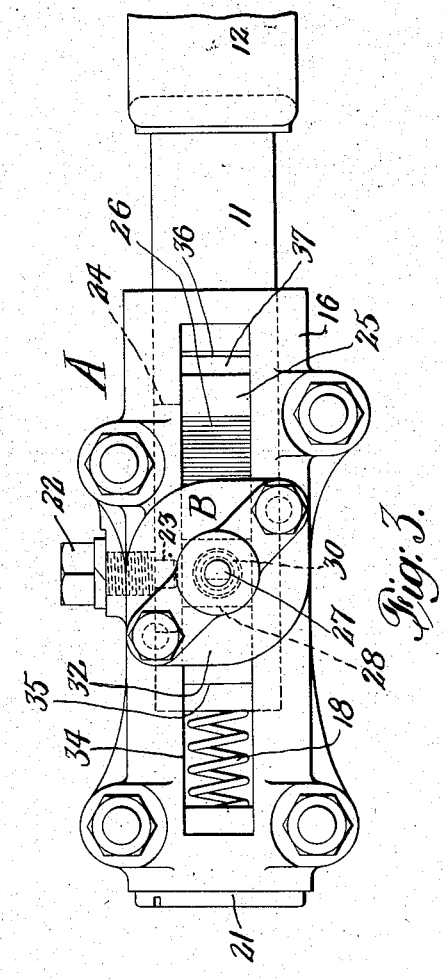
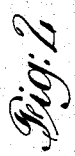
INVENTOR
Fred C. Thompson
BY
Synnestvedt + Lechner
ATTORNEYS Patented Dec. 9, 1930

1,783,987

UNITED STATES PATENT OFFICE

FRED C. THOMPSON, OF DETROIT, MICHIGAN, ASSIGNOR TO MORSE CHAIN COMPANY, OF ITHACA, NEW YORK, A CORPORATION OF NEW YORK

CHAIN-ADJUSTING DEVICE

Application filed February 19, 1929. Serial No. 341,123.

This invention relates to chain adjusting devices and is particularly useful in connection with front end drives for automobiles.

One of the primary objects of my invention is the provision of an improved chain adjusting device of the type operating to automatically take up slack in the chain as it develops, in which tendencies for the chain to become objectionably tight are compensated for.

More specifically stated, it is an object of my invention to provide an improved chain adjuster of the character set forth which includes means permitting a limited amount of movement of the adjuster in a direction to compensate for forces tending to have the effect of causing the chain to become objectionably tight.

How the foregoing, together with such other objects and advantages as may hereinafter appear, or are incident to my invention, are realized, is illustrated in preferred form in the accompanying drawings, wherein—

Fig. 1 is a face view of a typical front end layout of an automobile with the casing appearing in section and with the sprockets and chain diagrammatically shown and illustrating an application of my invention.

Fig. 2 is an enlarged longitudinal section through the chain adjuster device, the section being taken on the line 2—2 of Fig. 1.

Fig. 3 is a front view of a portion of the adjuster device looking in the direction of the arrows 3—3 of Fig. 2, and Fig. 4 is a cross section taken on the line 4—4 of Fig. 2.

Referring to Figure 1, the particular front end drive illustrated comprises, in general, a sprocket 5 mounted on the crank shaft, a sprocket 6 mounted on the cam shaft, a sprocket 7 mounted on the accessory shaft, a sprocket 8 mounted on the fan shaft, a sprocket 9 mounted on the generator shaft, and a chain 10 passing over the sprockets as shown, which chain is of the duplex type.

My improved chain adjusting device A in this instance operates on the run of chain which is between the sprockets 5 and 9. The device A comprises a plunger 11 having a forked end 12 carrying a pin 13 on which a sprocket wheel 14 is rotatably mounted. The plunger 11 fits the bore 15 of a support or bracket 16 which is secured in any suitable manner to the front housing 17 of the engine. A spring 18 operates on the plunger 11 to move it outwardly, which spring fits a bore 19 in the plunger. The spring at one end engages the plunger at 20 and at its other end it engages the nut 21 which serves as a closure for the bore 15. In Fig. 4 I have shown a screw 22 threaded into the support 16 and having a reduced end 23 which fits a longitudinally extending slot 24 in the plunger 11 whereby the plunger is prevented from rotating.

The device A is mounted in the front end housing 17 in a position to bring the sprocket 14 into engagement with the chain 10, it being pointed out that the plunger is pushed into the bore to compress the spring 18 when the device is mounted in position. Thus it will be seen that the sprocket 14 is spring pressed against the chain and will keep the chain tight. If the chain tends to become slack in service, the sprocket, due to the pressure of the spring, will operate on the chain to take up the slack as it develops.

In order to prevent the adjusting device from returning to positions of loose adjustment, i. e., positions in which the chain would become slack and in which there would be danger of the chain jumping the sprocket teeth with consequent upsetting of the timing of engine, I have provided a stop mechanism B. This mechanism comprises a ratchet bar 25 formed of a flat plate having a plurality of serrations or notches 26, and a pin 27 having a head portion 28 provided with teeth 29 adapted to engage the serrations 26 in the bar 25 under influence of the spring 30 which presses the pin against the bar.

The ratchet bar 25 is set in a recess 31 provided in the plunger 11 and the pin 27 and spring 30 are mounted in a removable member 32 adapted to be secured to the support 16. In the particular form illustrated in the drawings the member 32 is provided with lugs 33 entering the slot 34 in the support 16 which serve to guide the bar 25. The bar is guided at the sides by the walls of the slot 34.

Referring now particularly to Fig. 2, it will be seen that the recess 31 is longer than the ratchet bar 25 and that with the device in the position shown in this figure, the end wall 35 of the recess engages the ratchet bar, while the other end wall 36 of the recess is spaced away from the bar. In effect the end walls 35 and 36 of the recess constitute spaced abutments, the spacing of which is greater than the length of the ratchet bar. It will thus be seen that while the ratchet bar moves with the plunger 11 when the abutment 35 engages the bar, there nevertheless is a limited amount of relative movement between the plunger and bar, the amount of which is determined by the spacing of the abutments. The arrangement may be said to be one providing a lost motion connection between the adjusting plunger and the stop device. The operation of the device and the purpose of and advantages to be derived from the novel arrangement of stop mechanism which I have provided will be clear from the following.

As slack in the chain develops the plunger 11 is moved in a direction to press the sprocket 14 against the chain to take up the slack, and in this movement of the plunger the abutment 35 engages the ratchet bar 25 and the bar moves along with the plunger. Upon movement of the bar the serrations 26 trip over or ratchet past the teeth 29 on the head of the spring pressed pin 27. The amount of such movement is determined by the looseness of the chain. When the chain is tight, the movement ceases and the stop device is set in a position to prevent movement of the adjusting plunger to a position in which the chain would run objectionably loose.

It is pointed out, however, that the adjuster may move backward in the amount of the clearance at 37 between the end of the ratchet bar and the abutment 36. The amount of clearance, however, is not great enough to permit of sufficient backward movement of the adjuster as would cause objectionable slack or looseness in the chain. In other words, the clearance is so proportioned as to permit only of a predetermined limited amount of backward movement.

The arrangement, therefore, is one which will allow a limited amount of backward movement of the adjuster before the device B acts to stop the movement which is very advantageous, for the reason that should forces develop, other than those of the adjuster device itself, which would have the effect of tightening the chain, the adjuster is enabled to move backward an amount to compensate therefor, and thus the chain will not become too tight as would be the case if the follow up stop device B acted to lock the adjuster in its adjusted position without the provision of means for compensating for such forces.

By way of example, let us assume that the adjuster device has taken the slack out of the chain and that a change of temperature takes place which would have the effect of tightening the chain still more. Under such conditions, without provision to the contrary, the chain would become objectionably tight and serious strains would develop in the drive. Through the provision of compensating means such as has been fully described hereinbefore, I overcome the above objections, and as a result, a very effective chain drive is provided which will have long life.

I claim:—

1. A tension adjuster for endless chains including yieldable means normally operating on the chain in a direction to take up slack therein, means for preventing movement of the adjuster to positions of loose adjustment, a lost motion connection between the first means and the second means adapted to set the second means when the first means moves in a direction to take up slack and to permit a limited amount of movement of the first means in a direction which would tend to make slack before the second means becomes effective to prevent movement in such direction.

2. In a tension adjuster for endless chains, the combination of a sprocket wheel; a movable mounting for the sprocket wheel; means operating on the mounting to move it with its sprocket in a direction to operate on the chain to take up slack therein as it develops; adjustable stop means for preventing movement of the sprocket wheel and its mounting to positions in which objectionable slack in the chain would develop, said stop means including a member having ratchet teeth, and a stop member engaging the ratchet teeth, one of said members being movable with the mounting and the other being carried by a fixed part; and a lost motion connection between the mounting and its member of the stop means whereby a limited amount of movement of the mounting in a direction in which slack in the chain would tend to develop is permitted before the stop means acts to stop such movement.

3. In a tension adjuster for endless chains, the combination of a sprocket wheel, a movable mounting for the sprocket wheel, spring means for moving the mounting and wheel against the chain to take up slack therein, ratchet means actuated by the mounting for preventing return of the adjuster to positions of loose adjustment, and a lost motion connection between the mounting and the ratchet means whereby a limited amount of backward movement of the mounting may occur, the amount of such movement being insufficient to develop objectionable slack in the chain.

4. In a tension adjuster for endless chains, the combination of a sprocket wheel, a plunger having means for carrying the sprocket wheel, a support in which the plunger is movably mounted, means operating on the plunger to move it and the sprocket carried thereby in a direction to act on the chain to take up slack in the chain as it develops, a ratchet bar carried by the plunger and movable with respect thereto, a spring pressed pawl carried by the support and engaging the ratchet, and means limiting the amount of movement of the ratchet bar with respect to the plunger, said means including spaced abutments, one engaging the ratchet bar at one end and the other engaging it at the other end.

In testimony whereof I have hereunto signed my name.

FRED C. THOMPSON.